(12) United States Patent
Ooms et al.

(10) Patent No.: US 7,858,727 B2
(45) Date of Patent: Dec. 28, 2010

(54) PROCESS FOR THE PREPARATION OF POLYCARBONATE

(75) Inventors: Pieter Ooms, Krefeld (DE); Andreas Bulan, Langenfeld (DE); Rainer Weber, Odenthal (DE); Johann Rechner, Kempen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/390,794

(22) Filed: Feb. 23, 2009

(65) Prior Publication Data

US 2009/0215977 A1 Aug. 27, 2009

(30) Foreign Application Priority Data

Feb. 27, 2008 (DE) .................. 10 2008 011 473

(51) Int. Cl.
*C08G 64/00* (2006.01)
*C08G 63/02* (2006.01)
(52) U.S. Cl. .................. 528/196; 528/198; 528/200
(58) Field of Classification Search ............ 528/196, 528/198, 200
See application file for complete search history.

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 2,999,846 A | 9/1961 | Schnell et al. | |
| 3,148,172 A | 9/1964 | Fox | |
| 3,271,367 A | 9/1966 | Schnell et al. | |
| 3,773,634 A | 11/1973 | Stacey et al. | |
| 3,986,269 A | 10/1976 | Hancock | |
| 4,025,405 A | 5/1977 | Dotson et al. | |
| 4,212,967 A | 7/1980 | Govoni et al. | |
| 4,318,773 A | 3/1982 | Ullrich et al. | |
| 4,423,207 A | 12/1983 | Flock et al. | |
| 4,631,338 A | 12/1986 | Meyer et al. | |
| 4,980,105 A | 12/1990 | Schmidt et al. | |
| 4,982,014 A | 1/1991 | Freitag et al. | |
| 5,043,421 A | 8/1991 | Golba, Jr. et al. | |
| 5,200,091 A | 4/1993 | Chang | |
| 5,306,803 A | 4/1994 | Arlt et al. | |
| 6,340,736 B1 | 1/2002 | Coenen et al. | |
| 6,613,868 B2 | 9/2003 | Kauth et al. | |
| 2005/0115901 A1 | 6/2005 | Heuser et al. | |

FOREIGN PATENT DOCUMENTS

| | | |
|---|---|---|
| BE | 866991 | 11/1978 |
| DE | 1570703 | 2/1970 |
| DE | 2036052 | 1/1972 |
| DE | 2053876 | 5/1972 |
| DE | 2063050 | 7/1972 |
| DE | 2211956 | 10/1973 |
| DE | 3332065 A1 | 3/1985 |
| DE | 3429960 A1 | 2/1986 |
| DE | 3832396 A1 | 2/1990 |
| DE | 3833953 A1 | 4/1990 |
| DE | 4227372 A1 | 4/1993 |
| DE | 19510063 A1 | 9/1996 |
| EP | 0003996 | 9/1979 |
| EP | 0267025 A1 | 5/1988 |
| EP | 0411510 A2 | 2/1991 |
| EP | 0460450 A2 | 12/1991 |
| EP | 0541114 A2 | 5/1993 |
| EP | 1249463 A2 | 10/2002 |
| FR | 1561518 | 3/1969 |
| GB | 1122003 | 7/1968 |
| GB | 1229482 | 4/1971 |
| GB | 1341318 | 12/1973 |
| GB | 1367790 | 9/1974 |
| JP | 02147628 | 6/1990 |
| JP | 03292340 | 12/1991 |
| JP | 03292341 | 12/1991 |
| JP | 08245780 | 9/1996 |
| WO | WO-87/04637 A1 | 8/1987 |
| WO | WO 00/78682 A1 | 12/2000 |
| WO | WO-01/38419 A1 | 5/2001 |
| WO | WO-03/070639 A1 | 8/2003 |

*Primary Examiner*—Terressa M Boykin
(74) *Attorney, Agent, or Firm*—Connolly Bove Lodge & Hutz LLP

(57) ABSTRACT

The invention relates to a combined process for the preparation of polycarbonate by the phase boundary process and downstream electrolysis of sodium chloride-containing process wastewater.

26 Claims, No Drawings

PROCESS FOR THE PREPARATION OF POLYCARBONATE

RELATED APPLICATIONS

This application claims benefit to German Patent Application No. 10 2008 011 473.1, filed Feb. 27, 2008, which is incorporated herein by reference in its entirety for all useful purposes.

BACKGROUND OF THE INVENTION

The invention relates to a combined process for the preparation of polycarbonate by the phase boundary process and electrolysis of sodium chloride-containing process wastewater.

The preparation of polycarbonates by the phase boundary process is generally known. It is usually effected in a continuous process, by preparation of phosgene and subsequent reaction of bisphenols and phosgene in the presence of alkali and a catalyst, preferably a nitrogen catalyst, chain terminators and optionally branching agents in a mixture of aqueous alkaline phase and organic solvent phase, at the boundary.

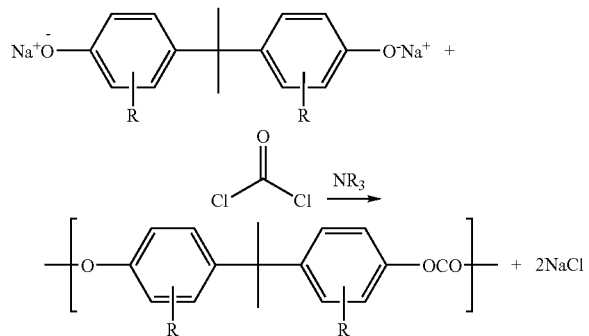

The preparation of polycarbonates, for example by the phase boundary process, is described in principle in the literature, see Schnell, "Chemistry and Physics of Polycarbonates", Polymer Reviews, Volume 9, Interscience Publishers, New York, London, Sydney 1964, pages 33-70; D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 18, (1980)"; pages 75-90, D. Freitag, U. Grigo, P. R. Müller, N. Nouvertne', BAYER AG, "Polycarbonates" in Encyclopedia of Polymer Science and Engineering, Volume 11, Second Edition, 1988, pages 651-692, and finally by Dres. U. Grigo, K. Kircher and P. R-Müller "Polycarbonate" in Becker/Braun, Kunststoff-Handbuch [Plastics Handbook], Volume 3/1, Polycarbonate, Polyacetale, Polyester, Celluloseester [Polycarbonates, polyacetals, polyesters, cellulose esters], Carl Hanser Verlag Munich, Vienna 1992, pages 118-145.

In the preparation of polycarbonates, the phase boundary process, also referred to as two-phase boundary process, has proved its worth for many years. The process permits the preparation of thermoplastic polycarbonates in a number of fields of use, such as, for example, for data media (CD, DVD), for optical applications or for medical applications.

Frequently, good thermal stability and a low degree of yellowing are described as important quality features for polycarbonate. Little attention has been paid to date to quality of the wastewater obtained in the preparation of polycarbonates. In particular, the pollution of the wastewater with residual organic substances, such as, for example, residual phenols, is of importance for a possible further treatment of the wastewater, for example by a wastewater treatment plant or by ozonolysis for oxidation of the residual organic substances. In this context, there have been a number of applications which, however, predominantly describe methods for subsequent wastewater treatment with the aim of reducing the pollution by phenolic components—cf. for example: JP 08 245 780 A (Idemitsu); DE 19 510 063 A1 (Bayer); JP 03 292 340 A (Teijin); JP 03 292 341 A (Teijin); JP 02 147 628 A (Teijin).

The pollution of the wastewater with residual organic substances, such as, for example bisphenols or, for example, phenols used as chain terminators can be kept low if a large excess of phosgene is employed. This is, however, undesired for economic reasons.

In the preparation of polycarbonates with a reduced excess of phosgene, there is the danger that not all bisphenol or all monophenol will react and the wastewater will be polluted. Furthermore, there is the danger that the phase separation and the scrubbing are complicated in that the surface-active phenolic OH groups remain in the polymer. As a result, it is possible that not all water-soluble impurities will be extracted from the organic phase. This in turn can adversely affect the product quality.

It remains to state that the preparation of polycarbonate of high quality by a continuous two-phase boundary process with simultaneously low pollution of the wastewater is possible either only with a large excess of phosgene or with phase separation problems—associated with declines in the quality of the polycarbonate—or by subsequent treatment of the wastewater, as a result of which the cost-efficiency of the process is reduced.

DE-A 42 27 372 of the applicant, in which the arrangement of the apparatus of the process according to the invention has already been described, is to be considered as the most obvious prior art. In contrast to the teaching according to the invention, however, DE-A 42 27 372 provides no teaching at all regarding quantity ratios and especially regarding circulation ratios in which the starting materials are combined, to say nothing of the fact that particularly low wastewater pollution with residual organic substances, such as phenols and bisphenols, can be achieved by means of specially established quantity and circulation ratios.

In these known processes, however, a higher residual content of bisphenols or phenols—also referred to below as residual phenol content—requires complicated purification operations in the wastewater of these processes which can pollute the environment and present the wastewater treatment plants with a greater wastewater problem.

Usually, the sodium chloride-containing solution has to be freed from solvents and organic residues and must then be disposed of.

However, it is also known that, according to EP 1 200 359 B1 (WO 2000/078682 A1) or U.S. Pat. No. 6,340,736, the purification of the sodium chloride-containing wastewaters can be effected by ozonolysis and is then suitable for use in sodium chloride electrolysis. A disadvantage of the ozonolysis is that this process is very expensive.

According to EP 541 114 A2, a sodium chloride-containing wastewater stream is evaporated down until complete removal of the water, and the remaining salt with the organic impurities is subjected to a thermal treatment, with the result that the organic constituents are decomposed. The use of infrared radiation is particularly preferred here. A disadvantage of the process is that the water has to be completely evaporated, so that the process cannot be carried out economically.

According to WO 03/070639 A1, the wastewater from a polycarbonate production is purified by extraction with methylene chloride and then fed to the sodium chloride electrolysis. By means of the process described, however, only at most 14% of the sodium chloride can be recovered from the wastewater of the polycarbonate production since, the water introduced into the electrolysis with the wastewater will shift the water balance of the sodium chloride electrolysis out of equilibrium if larger amounts are used. The precondition of this is that a wastewater having an NaCl content of 10% is used and a water transport of 4 mol of water per mole of sodium is effected by the ion exchanger membrane in the NaCl electrolysis.

The sodium chloride-containing solutions which are obtained in the polycarbonate production typically have a sodium chloride content of 6 to 10% by weight. Thus, the total sodium chloride present in the solutions can never be recovered. At a sodium chloride concentration of 10% by weight, only the use of about 13% of sodium chloride from the sodium chloride-containing solutions is possible in the standard sodium chloride electrolysis with a commercially available ion exchanger membrane which exhibits water transport of 3.5 mol of water per mole of sodium. Even with a concentration to a saturated sodium chloride solution of about 25% by weight, only a recycling proportion of 38% of the sodium chloride present in the sodium chloride-containing solution will be possible. Complete recycling of the sodium chloride-containing solution has not been disclosed. According to WO-A 01/38419, the sodium chloride-containing solution can be evaporated down by means of thermal processes, so that a highly concentrated sodium chloride solution can be fed to the electrolysis cell. However, evaporating down is energy-intensive and expensive.

Starting from the prior art described above, it is the object to provide a process which gives products in high purity and good yield, and at the same time represents a reduction of the environmental pollution or wastewater problem in the wastewater treatment plants by maximized recycling of sodium chloride and sodium chloride-containing process wastewater solutions which are obtained from polycarbonate production.

In particular, it should be taken into account in the recycling that the conversion of sodium chloride into chlorine and sodium hydroxide solution and optionally hydrogen has to be effected with the minimum use of energy and therefore also in a manner which spares resources.

It has now been found that, in the continuous preparation of polycarbonate by reaction of bisphenols and phosgene in an inert solvent or solvent mixture in the presence of base(s) and catalyst(s), improved recycling of sodium chloride from the sodium chloride-containing wastewater solutions obtained at the boundary can be achieved without complicated purification after a pH adjustment to a pH of less than or equal to 8 and after simple treatment with active carbon, by direct feeding to an electrochemical oxidation of the sodium chloride present to chlorine, sodium hydroxide and optionally hydrogen, it being possible for the chlorine to be recycled for the preparation of the phosgene.

EMBODIMENTS OF THE INVENTION

An embodiment of the present invention is a process for preparing polycarbonate by the phase boundary process and processing at least a part of the resulting alkali metal chloride-containing solution in a downstream alkali metal chloride electrolysis, comprising:
 a) preparing phosgene by reacting chlorine with carbon monoxide;
 b) reacting the phosgene of a) with at least one bisphenol in the presence of at least one base, optionally at least one basic catalyst, and optionally at least one organic solvent, to give a polycarbonate and an alkali metal chloride-containing solution;
 c) isolating and working-up the polycarbonate of b);
 d) separating the alkali metal chloride-containing solution remaining in c) from solvent residues and optionally catalyst residues;
 e) electrochemically oxidating at least a part of the alkali metal chloride-containing solution of d) to form chlorine, alkali metal hydroxide solution, and optionally hydrogen;

wherein, in d) the solution is adjusted to a pH of less than or equal to 8 prior to treatment with adsorbents; and
 f) at least a part of the chlorine prepared in e) is recycled to a); and/or
 g) at least a part of the alkali metal hydroxide solution prepared in e) is recycled to b).

Another embodiment of the present invention is the above process, wherein d) is achieved by stripping off the solution with steam and treating it with an adsorbent.

Another embodiment of the present invention is the above process, wherein said adsorbent is activated carbon.

Another embodiment of the present invention is the above process, wherein e) is achieved using a gas diffusion electrode as a cathode.

Another embodiment of the present invention is the above process, wherein at least a part of the purified alkali metal chloride-containing solution of d) is added to the brine circulation of a membrane electrolysis for the preparation of chlorine, sodium hydroxide solution, and optionally hydrogen.

Another embodiment of the present invention is the above process, wherein additional alkali metal chloride is added to the alkali metal chloride-containing solution in e) to increase the alkali metal chloride concentration.

Another embodiment of the present invention is the above process, wherein the alkali metal chloride-containing solution in d) prior to treatment with absorbents is adjusted to a pH of less than 7.

Another embodiment of the present invention is the above process, wherein the alkali metal chloride-containing solution is adjusted to a pH of less than 7 by using hydrochloric acid or hydrogen chloride.

Another embodiment of the present invention is the above process, wherein the alkali metal chloride concentration of the alkali metal chloride solution entering e) is in the range of from 100 to 280 g/l and/or the concentration of the sodium hydroxide solution obtained in e) is in the range of from 13 to 33% by weight.

Another embodiment of the present invention is the above process, wherein the alkali metal chloride concentration of the alkali metal chloride solution entering e) is in the range of from 110 to 220 g/l and/or the concentration of the sodium hydroxide solution obtained in e) is in the range of from 20 to 32% by weight.

Another embodiment of the present invention is the above process, wherein an ion exchanger membrane whose water transport per mole of sodium ion is greater than 4 mol of $H_2O$/mol of sodium is used in e).

Another embodiment of the present invention is the above process, wherein the water transport per mole of sodium ion of said exchanger membrane is in the range of from 5.5 to 6.5 mol of $H_2O$/mol of sodium.

Another embodiment of the present invention is the above process, wherein the electrochemical oxidation of e) is operated at a current density of 2 to 6 kA/m$^2$, the area taken as a basis for calculating the current density being the membrane area.

Another embodiment of the present invention is the above process, wherein the electrochemical oxidation of e) is operated at a temperature in the range of from 70 to 100° C.

Another embodiment of the present invention is the above process, wherein the electrochemical oxidation of e) is operated at a temperature in the range of from 80 to 95° C.

Another embodiment of the present invention is the above process, wherein the electrochemical oxidation of e) is operated at an absolute pressure in the range of from 1.0 to 1.4 bar.

Another embodiment of the present invention is the above process, wherein the electrochemical oxidation of e) is operated at an absolute pressure in the range of from 1.1 to 1.3 bar.

Another embodiment of the present invention is the above process, wherein the electrochemical oxidation of e) is operated with a pressure difference between cathode space and anode space in the range of from 20 to 150 mbar.

Another embodiment of the present invention is the above process, wherein the electrochemical oxidation of e) is operated with a pressure difference between cathode space and anode space in the range of from 30 to 100 mbar.

Another embodiment of the present invention is the above process, wherein the electrochemical oxidation of e) is operated with an anode which contains, as a coating, ruthenium oxide and at least one further noble metal compound of the 7th and 8th subgroups and/or of the 4th main group of the Periodic Table of the Elements.

Another embodiment of the present invention is the above process, wherein anodes having a larger surface area than the surface area of the membranes are used in the electrochemical oxidation of e).

Another embodiment of the present invention is the above process, wherein the alkali metal chloride-containing solution of d) is concentrated before e) by means of a membrane process.

Another embodiment of the present invention is the above process, wherein at least one bisphenol is a dihydroxydiarylalkane of formula (I)

HO—Z—OH     (I)

wherein Z is a divalent organic radical having 6 to 30 carbon atoms which contains one or more aromatic groups.

Another embodiment of the present invention is the above process, wherein at least one bisphenol is selected from the group consisting of 4,4'-dihydroxybiphenyl; 2,2-bis(4-hydroxyphenyl)-1-phenylpropane; 1,1-bis(4-hydroxyphenyl)phenylethane; 2,2-bis(4-hydroxyphenyl)propane; 2,4-bis(4-hydroxyphenyl)-2-methylbutane; 1,3-bis[2-(4-hydroxyphenyl)-2-propyl]benzene; 2,2-bis(3-methyl-4-hydroxyphenyl)propane; bis(3,5-dimethyl-4-hydroxyphenyl)methane; 2,2-bis(3,5-dimethyl-4-hydroxyphenyl)-propane; bis(3,5-dimethyl-4-hydroxyphenyl)sulphone; 2,4-bis(3,5-dimethyl-4-hydroxyphenyl)-2-methylbutane; 1,3-bis[2-(3,5-dimethyl-4-hydroxyphenyl)-2-propyl]benzene; 1,1-bis(4-hydroxyphenyl)cyclohexyne; and 1,1-bis(4-hydroxyphenyl)-3,3,5-trimethylcyclohexane.

Another embodiment of the present invention is the above process, wherein the alkali metal chloride-containing solution of the reaction wastewater from b) or the alkali metal chloride-containing solution of the reaction wastewater from b) at least partly combined with wash water from c) of the polycarbonate is used.

Another embodiment of the present invention is the above process, wherein c) comprises:
aa) separating polycarbonate-containing organic phase and aqueous alkali metal chloride-containing reaction wastewater solution;
bb) washing the polycarbonate-containing organic phase obtained in aa) at least once;
wherein at least a part of the wash phase(s) from bb), after separating out catalyst residues and optionally organic solvent residues, is optionally used as a partial replacement of the water for preparing the sodium hydroxide solution of b).

DESCRIPTION OF THE INVENTION

The invention relates to a process for the preparation of polycarbonate by the phase boundary process and processing at least a part of the resulting alkali metal chloride-containing solution in a downstream alkali metal chloride electrolysis, comprising the following steps:
(a) preparation of phosgene by reaction of chlorine with carbon monoxide,
(b) reaction of the phosgene formed according to step a) with at least one bisphenol in the presence of at least one base, preferably at least one alkali metal-containing base, in particular a sodium-containing base, optionally at least one basic catalyst and optionally at least one organic solvent to give a polycarbonate and an alkali metal chloride-containing solution, in particular sodium chloride-containing solution,
(c) isolation and working-up of the polycarbonate formed in step b),
(d) separation of the alkali metal chloride-containing solution remaining according to step c) from solvent residues and optionally catalyst residues, in particular by stripping off the solution with steam and treatment with adsorbents, in particular with active carbon,
(e) electrochemical oxidation of at least a part of the alkali metal chloride-containing solution from d) with the formation of chlorine, alkali metal hydroxide solution and optionally hydrogen, characterized in that, in the separation d) of the solution from solvent and/or catalyst residues prior to treatment with adsorbents, the solution is adjusted to a pH of less than or equal to 8 and
(f) at least a part of the chlorine prepared according to step e) is recycled to the preparation of phosgene according to step a) and/or
(g) at least a part of the alkali metal hydroxide solution prepared according to step e) is recycled to the preparation of polycarbonate according to step b).

The alkali metal chloride-containing solution of the reaction wastewater from step b), or at least partly in combination with wash water from the working-up c) of the polycarbonate, is preferably used.

Suitable bisphenols are dihydroxydiarylalkanes of the general formula (I)

HO—Z—OH     (I)

in which Z is a divalent organic radical having 6 to 30 carbon atoms which contains one or more aromatic groups. Examples of such compounds which can be used in step b) of the process according to the invention are dihydroxydiarylalkanes such as hydroquinone, resorcinol, dihydroxybiphenyl, bis(hydroxyphenyl)alkanes, bis(hydroxyphenyl)cycloalkanes, bis(hydroxyphenyl)sulphides, bis(hydroxyphenyl) ethers, bis(hydroxyphenyl)ketones, bis(hydroxyphenyl)sulphones, bis(hydroxyl-phenyl)sulphoxides, α,α'-bis(hydroxyphenyl)diisopropylbenzenes, and those compounds thereof which are alkylated, alkylated on the nucleus and halogenated on the nucleus.

Preferred dihydroxydiarylalkanes are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane (bisphenol A (BPA)), 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclo-hexane and 1,1-bis(4-hydroxyphenyl)-3,3,5-trimethylcyclohexane (bisphenol TMC).

Particularly preferred dihydroxydiarylalkanes are 4,4'-dihydroxybiphenyl, 1,1-bis(4-hydroxyphenyl)phenylethane, 2,2-bis(4-hydroxyphenyl)propane (bisphenol A (BPA)), 2,2-bis(3,5-dimethyl-4-hydroxyphenyl)propane, 1,1-bis(4-hydroxyphenyl)-cyclohexane and 1,1-bis(4-hydroxyphenyl)-3, 3,5-trimethylcyclohexane (bisphenol TMC).

This and further suitable dihydroxydiarylalkanes are described, for example, in U.S. Pat. No. 2,999,835, U.S. Pat. No. 3,148,172, U.S. Pat. No. 2,991,273, U.S. Pat. No. 3,271,367, U.S. Pat. No. 4,982,014 and U.S. Pat. No. 2,999,846, the German Laid-Open applications DE-A 15 70 703, DE-A 20 63 050, DE-A 20 36 052, DE-A 22 11 956 and DE-A 38 32 396, French patent FR-A 1 561 518, in the monograph by H. Schnell, Chemistry and Physics of Polycarbonates, Interscience Publishers, New York 1964, page 28 et seq., page 102 et seq., and by D. G. Legrand, J. T. Bendler, Handbook of Polycarbonate Science and Technology, Marcel Dekker New York 2000, page 72 et seq.

In the case of the preparation according to the invention of homopolycarbonates, only one bisphenol is used. In the case of the preparation according to the invention of copolycarbonates, a plurality of bisphenols is used, it being possible of course for the bisphenols used, such as all other chemicals and auxiliaries added to the synthesis, to be contaminated with the impurities originating from their own synthesis, handling and storage, although it is desirable to work with raw materials which are as pure as possible.

It should be emphasized here that the process according to the invention can be used virtually for all known bisphenols.

The bisphenols are used in the process according to the invention in aqueous alkaline solution, and the concentration of bisphenols is 10 to 20% by weight, preferably 12.5 to 17.5% by weight, based on the total weight of the solution. The amount of alkali in the aqueous alkaline solution is 1.0 to 3.0 mol of alkali per mole of bisphenol and is dependent on the solubility of the bisphenol used.

The phosgene is preferably used in solution in at least one organic solvent. The concentration of the phosgene in this solution is preferably from 7 to 10% by weight, particularly preferably 8 to 9.5% by weight used.

Suitable chain terminators and branching agents are known from the literature. Some are described, for example, in DE-A 38 33 953. Preferably used chain terminators are phenol or alkylphenols, in particular phenol, p-tert-butylphenol, isooctylphenol, cumylphenol, the chlorocarbonic acid esters thereof or acid chlorides of monocarboxylic acids or mixtures of these chain terminators. Preferred chain terminators are phenol, cumylphenol, isooctylphenol and para-tert-butylphenol.

Examples of compounds suitable as branching agents are aromatic or aliphatic compounds having more than three, preferably three or four, hydroxyl groups. Particularly suitable examples with three or more than three phenolic hydroxyl groups are phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol and tetra(4-hydroxyphenyl)methane.

Examples of other trifunctional compounds suitable as branching agents are 2,4-dihydroxybenzoic acid, trimesic acid, cyanuric chloride and 3,3-bis(3-methyl-4-hydroxyphenyl)-2-oxo-2,3-dihydroindole.

Particularly preferred branching agents are 3,3-bis(3-methyl-4-hydroxyphenyl)-2-oxo-2,3-dihydroindole and 1,1,1-tri(4-hydroxyphenyl)ethane.

The base used in step b) for the formation of the bisphenolate may be an alkali metal hydroxide solution with hydroxides from the series: Na, K and Li hydroxide, and optionally alkaline earth metal hydroxide solutions may also be used. Alkali-containing bases, such as, for example, sodium hydroxide solution, potassium hydroxide solution or mixtures of these are preferred. Aqueous sodium hydroxide solution is very particularly preferred. In the process according to the invention, commercially available sodium hydroxide solution is preferably used, particularly those having an NaOH content of 20 to 60% by weight, very particularly preferably having an NaOH content of 30 to 50% by weight. In preferred embodiments of the process according to the invention, sodium hydroxide solution which is obtained directly from the amalgam or membrane process of the chloralkali electrolysis is used.

Suitable basic catalysts for the reaction b) are in principle all catalysts known for the preparation of polycarbonates by the two-phase boundary process. Suitable catalysts for the reaction in step b) of the process according to the invention are preferably tertiary amines, such as, for example, triethylamine, tributylamine, trioctylamine, N-alkylpieridines, such as, for example, N-ethylpiperidine, N-methylpiperidine or n-iso-/n-propylpiperidine, pyridine, quaternary ammonium salts, such as, for example, tetrabutylammonium, tributylbenzylammonium, tetraethylammonium hydroxide, chloride, bromide, hydrogen sulphate or tetrafluoroborate, and the phosphonium compounds corresponding to the abovementioned ammonium compounds. These compounds are described in the literature as typical phase boundary catalysts, are commercially available and are familiar to the person skilled in the art. The total amount of the catalysts used is between 0.001 and 10 mol %, preferably 0.01 to 8 mol %, particularly preferably 0.05 to 5 mol % based on moles of bisphenol(s) used.

The basic catalyst used may be open-chain or cyclic, triethylamine and ethylpiperidine are very particularly preferred. The catalyst is used in the novel process preferably as a 1 to 55% strength by weight solution in the organic solvent used in step b).

Phosgene can be used in process step b) in liquid or gaseous form or in solution in an inert solvent.

Inert organic solvents which can preferably be used in step b) of the process according to the invention are all known solvents which are capable of dissolving polycarbonate at temperatures of about 20° C. to an extent of at least 5% by weight, and mixtures thereof. Suitable solvents are aromatic and/or aliphatic chlorinated hydrocarbons, preferably dichloromethane, trichloroethylene, 1,1,1-trichloroethane, 1,1,2-trichloroethane and chlorobenzene and mixtures thereof. However, it is also possible to use aromatic hydrocarbons, such as benzene, toluene, m-/p-/o-xylene, or aromatic ethers, such as anisole, or mixtures of these with one another or with the abovementioned chlorinated solvents. For example, dichloromethane, toluene, the various dichloroethanes and chloropropanes, chlorobenzene and chlorotoluene or mixtures of these are preferred. Dichloromethane or a mixture of dichloromethane and chlorobenzene is preferably used. Particularly preferred are dichloromethane and mixtures of dichloromethane and monochlorobenzene, in very particularly preferred embodiments mixtures of dichloromethane and monochlorobenzene in the ratio of 20:80 parts by weight to 75:25 parts by weight.

Preferably a pH of from 8.5 to 14, particularly preferably from 9.5 to 13, is established over the total reaction. This is effected by a procedure in which the amount of alkali metal hydroxide solution required to dissolve the bisphenols is used once at the beginning, and in addition further subsequent meterings can be carried out in the course of the reaction. The pH of the aqueous phase should preferably be kept in the alkaline range, preferably of 8.5 to 12, particularly preferably of 9.5 to 12, optionally by subsequently metering alkali metal hydroxide solution once or several times during or after the phosgene metering, whereas it should be 10 to 14, particularly preferably 10 to 13, after the addition of catalyst. Optionally, the subsequent metering of the alkali metal hydroxide solution can be also be effected in the form of subsequent metering of bisphenol solution in alkali metal hydroxide solution.

The polycarbonates obtainable by the process according to the invention can be used industrially as any desired mouldings or sheets and films in a known manner, for example in the automotive sector or in optical applications or optical and magnetooptical storage media.

The reaction of step b) can be effected continuously or batchwise; it is preferably effected continuously and particularly preferably with plug flow without major back-mixing. This can be effected, for example, in tubular reactors. The thorough mixing of the two phases (aqueous and organic phase) can be realized by known mixing members, such as, for example, installed orifice plates, static mixers and/or, for example, pumps.

The reaction according to step b) is particularly preferably effected in two stages.

In the preferred process, phosgene is used in step b) in the molar ratio of 1:1.12 to 1:2.22, preferably of 1:1.14 to 1:1.20, relative to the bisphenols. The solvent is admixed so that the polycarbonate is present in a 5 to 60% strength by weight solution, preferably 20 to 45% strength by weight solution, after the reaction.

Particularly in the case of the continuous reaction for step b), the total reaction in step b), i.e. the reaction of phosgene with bisphenol(s) and further condensation, can be effected in stirred tanks, tubular reactors, pumped circulation reactors or stirred tank cascades or combinations thereof, it being particularly advantageous if aqueous and organic phases are mixed by use of mixing members so that aqueous and organic phase separate as far as possible when the synthesis mixture has reacted completely, i.e. no more hydrolysable chlorine or phosgene or chlorocarbonic acid esters are present.

In a particularly preferred embodiment of step b) of the process according to the invention, the continuous combination of the organic phase and the aqueous phase is carried out in an apparatus system comprising heat exchanger with pump circulation loop and subsequently one or more dwell tank(s) and one or more dwell tube(s) (tubular reactor(s)), optionally with the use of one or more mixing members. For an optimum procedure, special reaction conditions can be established in the apparatus system and a specific ratio of starting components metered in to the amount of reaction emulsion circulated by pumping can be established in the pumped circulation reactor. Such processes are known to the person skilled in the art and are described, for example, in EP-A 1 249 463.

The polycarbonate obtained continuously in this manner is distinguished in particular by very good product quality—for example measured with respect to the Yellowness-Index (YI) and the content of terminal phenolic OH groups—and it is at the same time possible to achieve lower pollution of the wastewater by residual organic substances (residual phenol content), which is advantageous for the electrolysis of the wastewater.

After the reaction b), in step c), the organic phase containing the polycarbonate is usually washed with an aqueous liquid and is separated as far as possible from the aqueous phase after each wash process. The washing is preferably effected with desalinated water. After washing and separation of the wash liquid, the polycarbonate solution is usually turbid. Aqueous liquids for separating off the catalyst, for example a dilute mineral acid, such as HCl or $H_3PO_4$ are used as wash liquid, and desalinated water for further purification. The concentration of HCl or $H_3PO_4$ in the wash liquid may be, for example, 0.5 to 1.0% by weight. The organic phase is, for example and preferably, at least washed twice.

In principle, known separation vessels, phase separators, centrifuges or coalescers or combinations of these apparatuses can be used as phase separation apparatuses for separating the wash liquid from the organic phase.

Surprisingly high purities of the polycarbonate of >99.85% are thus obtained without taking into account the solvents still to be separated off.

In a preferred embodiment of the process according to the invention, the wash liquids separated off in step c) can be recycled to the process according to the invention, optionally after separation of catalyst residues and/or organic solvent residues.

The isolation and working-up of the polycarbonate formed in step b), according to step c), can preferably comprise at least the following steps:

aa) separation of polycarbonate-containing organic phase and aqueous alkali metal chloride-containing reaction wastewater solution, bb) washing of the polycarbonate-containing organic phase obtained in step aa) at least once, preferably at least twice, particularly preferably five times, and separation of the respective wash liquid.

It may be necessary to separate at least one of the wash liquid(s) obtained according to step c)bb) from catalyst residues and optionally organic solvent residues by adjusting the pH to at least 9, preferably at least 10, particularly preferably 10 to 11, by addition of at least one basic compound and to subject it to a subsequent extraction with at least one inert organic solvent or preferably subsequent stripping of the solution with steam. Suitable basic compounds for adjusting the pH are, for example, alkali metal or alkaline earth metal hydroxides or carbonates. The basic compounds can be used in solid form or in the form of their aqueous solutions. Alkali metal hydroxide solutions are preferably used, particularly preferably sodium hydroxide solution.

Preferably, at least part of the wash liquid(s) in step c)bb) can be used as partial replacement of the water for the preparation, in particular for adjusting the concentration of the sodium hydroxide solution in step b). In a preferred embodiment of the process according to the invention, at least part of the wash liquid(s) from step c)bb) can be used for diluting the alkali metal hydroxide solution prepared according to step e) before it is recycled to the preparation of polycarbonate according to step b).

The preferred embodiment of the process according to the invention, in which the wash liquid separated off in step c) are recycled to the process according to the invention, has the additional advantage of lower wastewater emission.

After the synthesis of the polycarbonate, the polycarbonate is separated off in the form of its solution in the organic solvent or solvent mixture used in the synthesis, for example methylene chloride or methylene chloride/chlorobenzene.

The isolation of the polycarbonate from the solution can be effected by evaporation of the solvent by means of heat, vacuum or a heated entraining gas. Other methods of isolation are, for example, crystallization and precipitation.

If the concentration of the polycarbonate solution is effected and possibly also the isolation of the polycarbonate by distilling off the solvent, optionally by superheating and expansion, the term "flash process" is used. Such a process is known to the person skilled in the art and is described, for example, in "Thermische Trennverfahren [Thermal separation methods]", VCH Verlagsanstalt 1988, page 114. If instead a heated carrier gas is sprayed together with a solution to be evaporated down, the term "spray evaporation/spray drying" is used, which is described by way of example in Vauck, "Grundoperationen chemischer Verfahrenstechnik [Basic operations of chemical process engineering]", Deutscher Verlag für Grundstoffindustrie 2000, 11th Edition, page 690. All these processes are described in the patent literature and in textbooks and are familiar to the person skilled in the art.

On removal of the solvent by heating (distilling off) or the technically more effective flash process, highly concentrated polycarbonate melts are obtained. In the flash process, polymer solutions are repeatedly heated under slightly superatmospheric pressure to temperatures above the boiling point at atmospheric pressure, and these solutions superheated relative to atmospheric pressure are then let down into a vessel at a lower pressure, e.g. atmospheric pressure. It may be advantageous not to allow the concentration stages, or in other words the temperature stages of the superheating, to become too large but preferably to choose a two- to four-stage process.

The residues of the solvent can be removed from the highly concentrated polycarbonate melts thus obtained, either directly from the melt by means of discharge extruders (cf. for example BE-A 866 991, EP-A 0 411 510, U.S. Pat. No. 4,980,105, DE-A 33 32 065), thin-film evaporators (cf. for example EP-A 0 267 025), falling-film evaporators or strand evaporators or by friction compacting (cf. for example EP-A 0 460 450), optionally also with an addition of an entraining agent, such as nitrogen or carbon dioxide, or with the use of a vacuum (cf. for example EP-A 0 039 96, EP-A 0 256 003, U.S. Pat. No. 4,423,207), alternatively also by subsequent crystallization (cf. for example DE-A 34 29 960) and/or expulsion of the solvent residues by heating in the solid phase (cf. for example U.S. Pat. No. 3,986,269, DE-A 20 53 876). These processes too in the apparatuses required for this purpose are described in the literature and are familiar to the person skilled in the art.

Polycarbonate granules can—if possible—be obtained by direct spinning of the melt and subsequent granulation or by the use of discharge extruders from which spinning is effected in air or under liquid, generally water. If extruders are used, additives can be added to the polycarbonate melt before the extruder, optionally with the use of static mixers or by side extruders in this extruder.

Alternatively, the polycarbonate solution can be subjected to spray evaporation. During spraying, the polycarbonate solution, optionally after heating, is either sprayed into a vessel at reduced pressure or sprayed by means of a nozzle with heated carrier gas, e.g. nitrogen, argon or steam, into a vessel at atmospheric pressure. In both cases, powders (diluted) or flakes (concentrated) of the polymer are obtained depending on the concentration of the polymer solution, from which powder or flakes the last residues of the solvent optionally also have to be removed as above. Thereafter, granules can be obtained by means of a compounding extruder and subsequent spinning. Here too, additives as described above may be added in the periphery or to the extruder itself. It is often necessary, owing to the low bulk density of the powders and flakes, for the polymer powder to pass through a compacting step prior to extrusion.

The polymer can be substantially precipitated from the washed and optionally also concentrated polycarbonate solution by addition of a nonsolvent for polycarbonate. The nonsolvents act as precipitating agents, It is advantageous here first to add a small amount of the nonsolvent and optionally also to allow waiting times between the additions of the batches of nonsolvent. It may also be advantageous to use different nonsolvents. For example, aliphatic or cycloaliphatic hydrocarbons, in particular heptane, isooctane or cyclohexane, alcohols, such as, for example, methanol, ethanol or isopropanol, ketones, such as, for example, acetone, or a mixture of these are used here as precipitating agents. In the precipitation, as a rule the polymer solution is added slowly to the precipitating agent. The polycarbonates thus obtained are processed to give granules as described in the case of the spray evaporation and optionally additives are introduced.

According to other processes, precipitation and crystallization products or amorphously solidified products are crystallized in fine-grained form by passing over vapours of one or more nonsolvents for polycarbonate, with simultaneous heating below the glass transition temperature, and are further condensed to give higher molecular weights. If these are oligomers, optionally having different terminal groups (phenolic and chain terminator ends) the term solid-phase condensation is used.

The polycarbonates thus purified are distinguished by very good product properties so that shaped articles of excellent quality can subsequently be produced therefrom.

The remaining alkali metal chloride-containing reaction wastewater solution according to step c) is advantageously freed from readily volatile organic impurities, such as, for example, residues of the organic solvent used in the synthesis and optionally catalyst, for example by distillation or steam stripping. A wastewater having a high content of dissolved sodium chloride (5-10% by weight) and dissolved sodium carbonates (0.3-1.5% by weight) then remains. The carbonates form, for example, by hydrolysis of the phosgene as a side reaction of the polycarbonate preparation. In addition, the wastewater is contaminated with organic compounds, for example with phenols (e.g. unsubstituted phenol alkylphenols).

The treatment of the prepurified wastewater with adsorbents is then preferably effected with active carbon.

According to a preferred process, the adjustment (reduction) of the pH in process step d) is carried out with hydrochloric acid or hydrogen chloride. The use of the more economical sulphuric acid, which is conceivable in principle but undesired in the present process, would lead on pH reduction to the formation of sodium sulphate, that would become concentrated in the anolyte circulation during the subsequent electrolysis. Since, for example, according to manufacturer's data, the ion exchanger membranes are allowed to be operated only up to a certain sodium sulphate concentration in the anolyte, more anolyte would have to be discharged than in the use of hydrochloric acid or hydrogen chloride, the reaction product of which is the desired sodium chloride.

The alkali metal chloride electrolysis process is described in more detail below. The following description is to be regarded by way of example in relation to the electrolysis of sodium chloride since in principle any alkali metal chloride can be used in the process, as already mentioned above (in particular LiCl, NaCl and KCl); the use of sodium chloride or sodium hydroxide solution in the preceding stages is, however, the preferred embodiment of the process.

Usually, membrane electrolysis processes are used, for example for the electrolysis of sodium chloride-containing solutions (cf. in this context Peter Schmittinger, CHLORINE, Wiley-VCH Verlag, 2000). Here, a two-part electrolysis cell which consists of an anode space with an anode and a cathode space with a cathode is used. Anode space and cathode space are separated by an ion exchanger membrane. A sodium chloride-containing solution having a sodium chloride concentration of, usually, more than 300 g/l is introduced into the anode space. At the anode, the chloride ion is oxidized to chlorine, that is removed from the cell with the depleted sodium chloride-containing solution (about 200 g/l). The sodium ions migrate under the influence of the electric field through the ion exchanger membrane into the cathode space. During this migration, each mole of sodium carries between 3.5 and 4 mol of water, depending on the membrane. As a result of this, the anolyte is depleted in water. In contrast to the anolyte, water is consumed on the cathode side by the electrolysis of water to give hydroxide ions and hydrogen. The water reaching the catholyte with the sodium ions is sufficient to keep the concentration of the sodium hydroxide solution in the outflow at 31-32% by weight, at an inflow concentration of 30% and a current density of 4 kA/m$^2$. In the cathode space, water is electrochemically reduced, hydroxide ions and hydrogen being formed.

Alternatively, the cathode used may also be the gas diffusion electrode at which oxygen is converted by electrons into hydroxide ions, no hydrogen forming. With the sodium ions which have reached the cathode space via the ion exchanger membrane, the hydroxide ions form sodium hydroxide solution. Usually, a sodium hydroxide solution having a concentration of 30% by weight is fed into the cathode chamber, and a sodium hydroxide solution having a concentration of 31-32% by weight is removed. The aim is to achieve as high a concentration of sodium hydroxide solution as possible since usually the sodium hydroxide solution is stored or transported at 50% strength by weight alkali. However, commercially available membranes are currently not stable to an alkali having a concentration higher than 32% by weight, so that the sodium hydroxide solution has to be concentrated by thermal evaporation.

In the case of the sodium chloride electrolysis, additional water is introduced into the anolyte via this sodium chloride-containing solution, but only water is discharged into the catholyte via the membrane. If water is introduced via the sodium chloride-containing solution in an amount greater than that which can be transported to the catholyte, the anolyte becomes depleted in sodium chloride and the electrolysis cannot be operated continuously. At very low sodium chloride concentrations, the side reaction of oxygen formation would start.

In order to feed maximum amounts of sodium chloride-containing solutions economically to the sodium chloride electrolysis, it may be useful if the water transport via the membrane is increased. This can be effected by the choice of suitable membranes, as described in U.S. Pat. No. 4,025,405. The effect of increased water transport is that it is possible to dispense with the otherwise usual addition of water for maintaining the alkali concentration.

According to U.S. Pat. No. 3,773,634, the electrolysis can be operated with high water transport through the membrane when an alkali concentration of 31 to 43% by weight and a sodium chloride concentration of 120 to 250 g/l are used.

A disadvantage of both processes is the lower current efficiency of these processes.

According to the preferred process, the separation d) of the sodium chloride-containing reaction wastewater is effected after the phase separation and the removal of the solvent and optionally used catalyst by stripping with steam and, after the pH adjustment, by an active carbon treatment.

Thereafter, the alkali metal chloride-containing wastewater can be fed directly to the electrolysis e).

Compared to the prior art (WO 03/70639 A1), in which not more than 13% of the sodium chloride present in the wastewater of the polycarbonate production can be used in the NaCl electrolysis, more than 13% of the sodium chloride from the wastewater can be recovered by the process according to the invention.

A further preferred process variant is that water is removed from the alkali metal chloride-containing wastewater by a concentration process. A process characterized in that the alkali metal chloride-containing solution from d) is concentrated before the electrolysis e) by means of a membrane distillation process, osmotic distillation or reverse-osmosis is therefore preferred.

For example, the reverse osmosis or particularly preferably the membrane distillation or membrane contactors can be used here (cf. MELIN; RAUTENBACH, Membranverfahren [Membrane processes]; SPRINGER, BERLIN, 2003). By combination of the operation according to the invention of the electrolysis cells and concentration processes, it is theoretically possible to recover up to 68% of the sodium chloride from the wastewater. This is true when the sodium chloride electrolysis produces only the required chlorine for the phosgene preparation and the required sodium hydroxide solution for the polycarbonate preparation and provides no chlorine for other applications.

The novel process can also be carried out with an alkali metal chloride electrolysis in which no hydrogen is produced at the cathode but the cathode is replaced by a gas diffusion electrode at which oxygen is reduced to hydroxide ions.

If, for example in an integrated location, no hydrogen is required for chemical reactions, the inevitable product hydrogen can be dispensed with. An advantage is an energy saving in the electrolysis, which is attributable to the lower electrolysis voltage with the use of a gas diffusions electrode.

The sodium chloride-containing solution from the polycarbonate production usually has a sodium chloride content of up to 10% by weight if it is the reaction wastewater. If the reaction wastewater is combined with the wash water, the NaCl concentration is, for example, about 6% by weight. If the electrolysis provides the chlorine and the sodium hydroxide solution exclusively for polycarbonate production, the sodium chloride-containing wastewater can be used only to a small extent in the electrolysis. Thus, in the case of the customary ion exchanger membranes and the standard operating parameters of the sodium chloride-electrolysis, only about 7% of the sodium chloride of a 6% strength by weight sodium chloride-containing polycarbonate wastewater solution can be used. The standard operating parameters of the NaCl electrolysis are a brine concentration in the outflow of 200 to 240 g/l and an NaOH concentration of 31-32% by weight. Complete recycling of the resulting sodium chloride has therefore not been possible to date. Concentration by thermal evaporation of the water is currently not economical since the sodium chloride is available as a very inexpensive product.

With the process according to the invention, substantially more than 13% of the sodium chloride from resulting wastewaters can be recycled at a concentration of 10% by weight if the sodium chloride electrolysis provides exclusively the chlorine and the sodium hydroxide solution for the polycarbonate production. Usually, sodium chloride electrolyses are operated at integrated chemical locations having a plurality of chlorine consumers, so that a sodium chloride-containing solution is not available for recycling from all consumers. The proportion of reusable sodium chloride from the wastewater increases if the sodium chloride electrolysis does not have to provide the sodium hydroxide solution and the chlorine exclusively for the polycarbonate production.

A further preferred variant of the novel process is that the wastewater of the polycarbonate preparation is concentrated by solid alkali metal chloride and is fed to the alkali metal chloride electrolysis. As a result of this, it is possible to reuse more than 13% of the alkali metal chloride from the polycarbonate wastewater.

However, this requires that the chlorine and the alkali metal hydroxide solution are not used exclusively for the polycarbonate production.

Particularly preferably, an alkali metal chloride-containing wastewater whose pH is less than 7 is used and fed to the electrolysis e). The pH adjustment is preferably effected with hydrochloric acid but can also be effected with gaseous hydrogen chloride.

According to a further preferred process, the NaCl electrolysis is operated in such a way that the NaCl solution which arrives from the cell has an NaCl concentration of less than 200 g/l. At the same time, the alkali concentration flowing out of the cell may be less than 30% by weight.

The water transport via the membrane depends not only on the operating parameters but also on the membrane type used. According to the process according to the invention, those ion exchanger membranes which enable water transport of more than 4.5 mol of water per mole of sodium through the membrane under the conditions of the sodium chloride and alkali concentration according to the invention are preferably used.

The current density is calculated relative to the membrane area and is in particular 2 to 6 kA/m². Anodes having a relatively large surface area are particularly preferably used. Anodes having a relatively large surface area are to be understood as meaning those in which the physical surface area is substantially larger than the projected surface area. Anodes having a relatively large surface area are, for example, electrodes having a foam- or felt-like composition. This offers a very large electrode surface area anodically and greatly reduces the local current density. The surface area of the anode is preferably to be chosen so that the local current density, based on the physical surface area of the electrode, is less than 3 kA/m². The larger the surface area and the lower the local current density, the lower can the sodium chloride concentration in the brine be chosen and the higher is the proportion of sodium chloride from the wastewater which can be recycled.

The pH of the alkali metal chloride-containing wastewater should preferably be less than 7, particularly preferably 0.5 to 6, before the electrolysis e).

The alkali metal chloride electrolysis should be operated so that the alkali metal chloride concentration of the alkali metal chloride solution emerging from the cell is between 100 to 280 g/l of sodium chloride and/or that the concentration of the alkali solution which emerges from the cell is 13 to 33% by weight.

The concentrations which permit the operation of the cell at lower voltages are particularly preferred. For this purpose, the concentration of the alkali metal chloride solution emerging from the cell should preferably be between 110 to 220 g/l of alkali metal chloride and/or the concentration of the alkali solution which emerges from the cell should be 20 to 30% by weight.

The ion exchanger membranes used in the electrolysis should preferably have a water transport per mole of sodium of more than 4.0 mol of $H_2O$/mol of sodium, particularly preferably 5.5 to 6.5 mol of $H_2O$/mol of sodium.

The process is preferably operated so that the electrolysis e) is operated at a temperature of 70 to 100° C., preferably at 80 to 95° C.

The electrolysis is operated at an absolute pressure of 1 to 1.4 bar, preferably at a pressure of 1.1 to 1.2 bar.

The pressure conditions between anode space and cathode space are chosen in particular so that the pressure in the cathode space is higher than the pressure in the anode space.

In a particularly preferred process, the pressure difference between cathode space and anode space should be 20 to 150 mbar, preferably 30 to 100 mbar.

In the case of lower alkali metal chloride concentrations, special anode coatings can also be used. In particular, the coating of the anode may also contain further noble metal components of the 7th and 8th subgroups of Periodic Table of the Elements in addition to ruthenium oxide. For example, the anode coating can be doped with palladium compounds. Coatings based on diamonds can also be used.

The general or preferred parameters or explanations mentioned in this application can also be arbitrarily combined with one another, i.e. between the respective ranges and preferred ranges.

The following examples are intended to illustrate the present invention but without limiting it.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The examples are intended to describe the process according to the invention with reference to sodium chloride-containing wastewater obtained in the preparation of polycarbonate.

Example 1

Addition of Sodium Chloride-Containing Reaction Wastewater to the Sodium Chloride Electrolysis-Feed of a 10% Strength by Weight Sodium Chloride Solution from the polycarbonate Preparation 24 000 kg/h with an alkaline bisphenol A solution which contains 15% by weight of bisphenol A (BPA) and 2.1 mol of sodium hydroxide solution per mole of BPA were metered before the pump via a T-piece, and 1848 kg/h of phosgene, dissolved in 20 400 kg/h of solvent which consisted of 50% by weight of methylene chloride and 50% by weight of monochlorobenzene, were metered via a further T-piece, into a pumped circulation reactor.

In order to maintain the alkalinity, 360 kg/h of 32% strength sodium hydroxide solution were metered in and the reaction mixture was passed back to the pump via a heat exchanger and an unstirred dwell container, the abovementioned material streams being metered in.

The amount circulated by pumping was determined as 260 m$^3$/h by means of a flow rate measurement.

The temperature was 36° C.

A portion of the emulsion, which was as large as the raw materials flowing in, was passed, before the metering points for BPA and phosgene, from the dwell container to a further pump and pumped through a tubular reactor. 1050 kg/h of sodium hydroxide solution (32% by weight) and 134 kg/h of p-tert-butylphenol, dissolved in 536 kg of solvent mixture, were metered into this stream. After a residence time of 10 min, 18 kg/h of N-ethylpiperidine in the form of a 4.8% strength solution in the solvent mixture (50 parts of methylene chloride and 50 parts of monochlorobenzene) were metered in and the emulsion was pumped through a further tubular reactor by means of a further pump.

After a residence time of a further 10 min, the emulsion was separated in a separation vessel and the polycarbonate solution was washed electrolyte-free by known methods, for example by the centrifuge technique.

The polycarbonate solution was concentrated in evaporation units and freed from residual solvent on a vented extruder.

The following analytical data were determined for the polycarbonate granules:
Yellowness Index (YI)=1.35 (measured according to ASTM E 313)
Relative viscosity ($\eta_{rel}$)=1.195 (measured according to ISO 1628/4)
Content of terminal phenolic OH groups=85 ppm (measured by UV spectroscopy at 546 nm after a colour reaction of the terminal phenolic groups with TiCl$_4$)

Here, the reaction wastewater was not combined with the wash phases and was freed from solvent residues and catalyst by stripping with steam. After neutralization with hydrochloric acid and treatment with active carbon, the reaction wastewater contained 10% by weight of NaCl and less than 2 ppm of free BPA and phenols, measured by UV spectroscopy of the aqueous phase at 294 nm, for example in a spectrometer from Perkin-Elmer.

It could be fed to the sodium chloride electrolysis cell without further purification.

The electrolysis was carried out, for example, in a laboratory electrolysis cell having an anode area of 0.01 m$^2$. The current density was 4 kA/m$^2$, outflow temperature on the cathode side 88° C. and outflow temperature on the anode side 89° C. An electrolysis cell having a standard anode coating and cathode coating from DENORA, Germany, was used. Nafion® 982 WX ion exchanger membrane from DuPont was used. The electrolysis voltage was 3.02 V. A sodium chloride-containing solution was pumped through the anode chamber at a mass flow rate of 1.0 kg/h. The concentration of the solution fed to the anode chamber was 25% by weight of NaCl. A 20% strength by weight NaCl solution could be taken off from the anode chamber. 0.125 kg/h of 10% strength by weight reaction wastewater from the polycarbonate preparation and 0.076 kg/h of solid sodium chloride were added to the NaCl solution taken off from the anode chamber. The solution was then fed back into the anode chamber. The water transport via the membrane was 3.5 mol of water per mole of sodium. 1% of the NaCl solution which emerged from the cell was discarded, corresponding to 0.008 kg/h of a 20% strength by weight NaCl-containing solution.

On the cathode side, the sodium hydroxide solution was circulated by pumping at a mass flow rate of 1.107 kg/h. The concentration of the sodium hydroxide solution fed into the cathode side was 30% by weight of NaOH and the sodium hydroxide solution taken off from the cathode side had a concentration of 31.9% by weight of NaOH. 0.188 kg/h of 31.9% strength by weight alkali was taken off from the volume flow and the remainder was made up with 0.0664 kg/h of water and recycled to the cathode element.

14% of the sodium chloride reacted originate from polycarbonate reaction wastewater.

Example 2

Addition of Sodium Chloride-Containing Reaction Wastewater to the Sodium Chloride Electrolysis of Gas Diffusion Electrode—Addition of a 10% Strength by Weight Sodium Chloride Solution (Reaction Wastewater) from the polecarbonate Preparation The wastewater corresponded in quality to that according to Example 1. Since no hydrogen is required for the preparation of polycarbonate, it was possible to dispense with the formation of hydrogen in the electrolysis. The electrolysis was therefore operated with gas diffusion electrodes. The current density was 4 kA/m$^2$, outflow temperature on the cathode side 88° C. and outflow temperature on the anode side 89° C. An electrolysis cell having a standard anode coating from DENORA, Germany, was used. Nafion® 982 WX ion exchanger membrane from DuPont was used. The electrolysis voltage was 2.11 V. 0.65 kg/h of a 25% strength by weight NaCl solution was fed into the anode chamber, and the solution taken off from the anode chamber contained 18% by weight of NaCl. 0.163 kg/h of 10% strength by weight reaction wastewater and 0.0715 kg/h of solid sodium chloride were added to the NaCl solution taken off from the anode chamber. The solution was then fed back into the anode chamber. The water transport via the membrane was 4.9 mol of water per mole of sodium.

On the cathode side, a sodium hydroxide solution was circulated by pumping at a mass flow rate of 1.107 kg/h. The concentration of the sodium hydroxide solution fed into the cathode side was 30% by weight of NaOH and the sodium hydroxide solution taken off from the cathode side had a concentration of 31.0% by weight of NaOH. 0.192 kg/h of the 31.0% strength by weight alkali was taken off from the volume flow and the remainder was made up with 0.0345 kg/h of water and recycled to the cathode element.

The proportion of reacted sodium chloride from the polycarbonate reaction wastewater was 18.6%.

Example 3

Addition of Sodium Chloride-Containing Reaction Wastewater to the Sodium Chloride Electrolysis with Gas Diffusion Electrode—Addition of a 10% Strength by Weight Sodium Chloride Solution (Reaction Wastewater) from the polycarbonate Preparation The wastewater corresponded in quality to that according to Example 1. Since no hydrogen is required for the preparation of polycarbonate, it was possible to dispense with the formation of hydrogen in the electrolysis. The electrolysis was therefore operated with gas diffusion electrodes. The current density was 4 kA/m$^2$, outflow temperature on the cathode side 88° C. and outflow temperature on the anode side 89° C. An electrolysis cell having a standard anode coating from DENORA, Germany, was used. Nafion® 2030 ion exchanger membrane from DuPont was used.

The electrolysis voltage was 1.96 V. 0.65 kg/h of NaCl solution was fed into the anode chamber, the sodium chloride concentration of the NaCl solution fed to the anode chamber was 25% by weight and that of the solution taken off from the anode chamber was 16.3% by weight of NaCl. 1% of the NaCl-containing solution taken off from the anode chamber was discarded, i.e. 0.00309 kg/h. 0.173 kg/h of 10% strength by weight reaction wastewater and 0.0703 kg/h of solid sodium chloride were added to the NaCl solution taken off from the anode chamber. The solution was then fed back into the anode chamber. The water transport via the membrane was 5.26 mol of water per mole of sodium.

On the cathode side, a sodium hydroxide solution was circulated by pumping out a mass flow rate of 1.107 kg/h. The concentration of the sodium hydroxide solution fed into the cathode side was 30% by weight of NaOH and the sodium hydroxide solution taken off from the cathode side had a concentration of 30.7% by weight of NaOH. 0.194 kg/h of the 30.7% strength by weight alkali was taken off from the volume flow and the remainder was made up with 0.0263 kg/h of water and recycled to the cathode element.

The proportion of reacted sodium chloride from the polycarbonate reaction wastewater was 19.8%.

Example 4

Recycling of Wash Phases from the polycarbonate Working-Up (Step c)) to the polycarbonate Preparation—Addition of a Wastewater Phase to the polycarbonate Preparation The procedure was as in Example 1, with the difference that, after separation of the organic from the aqueous alkali metal chloride-containing reaction wastewater solution in step c)aa), the organic polycarbonate-containing solution was washed with water, 0.6% strength hydrochloric acid and then several times with water.

The individual or combined wash phases from the polycarbonate working-up were adjusted to pH 10 with aqueous NaOH solution and then freed from solvent residues and catalysts by extraction with methylene chloride or by stripping with steam. The aqueous phases obtained after the phase separation can be reused as partial replacement of the water for the preparation of the NaOH solution for the polycarbonate preparation.

The first wash phase could additionally be combined with the reaction wastewater and, after removal of solvent residue and catalyst, fed to the NaCl electrolysis.

The invention claimed is:

1. A process for preparing polycarbonate by the phase boundary process and processing at least a part of the resulting alkali metal chloride-containing solution in a downstream alkali metal chloride electrolysis, comprising:
   a) preparing phosgene by reacting chlorine with carbon monoxide;
   b) reacting the phosgene of a) with at least one bisphenol in the presence of at least one base, optionally at least one basic catalyst, and optionally at least one organic solvent, to give a polycarbonate and an alkali metal chloride-containing solution;
   c) separating the polycarbonate and alkali metal chloride-containing solution of b) and subsequently washing the polycarbonate at least once with water;
   d) separating the alkali metal chloride-containing solution of c) from solvent residues and optionally separating the alkali metal chloride-containing solution from catalyst residues via treatment with an adsorbent, wherein prior to treatment with an adsorbent, the alkali metal chloride-containing solution is adjusted to a pH of less than or equal to 8; and
   e) electrochemically oxidating at least a part of the alkali metal chloride-containing solution of d) to form chlorine, alkali metal hydroxide solution, and optionally hydrogen;
   wherein
   f) at least a part of the chlorine prepared in e) is recycled to a); and/or
   g) at least a part of the alkali metal hydroxide solution prepared in e) is recycled to b).

2. The process of claim 1, wherein said alkali metal chloride-containing solution of c) is separated from solvent residues and catalyst residues via stripping off the solution with steam and treating it with an adsorbent.

3. The process of claim 2, wherein said adsorbent is activated carbon.

4. The process of claim 1, wherein e) is achieved using a gas diffusion electrode as a cathode.

5. The process of claim 1, wherein at least a part of the purified alkali metal chloride-containing solution of d) is added to the brine circulation of a membrane electrolysis for the preparation of chlorine, sodium hydroxide solution, and optionally hydrogen.

6. The process of claim 1, wherein additional alkali metal chloride is added to the alkali metal chloride-containing solution in e) to increase the alkali metal chloride concentration.

7. The process of claim 1, wherein the alkali metal chloride-containing solution in d) prior to treatment with absorbents is adjusted to a pH of less than 7.

8. The process of claim 7, wherein the alkali metal chloride-containing solution is adjusted to a pH of less than 7 by using hydrochloric acid or hydrogen chloride.

9. The process of claim 1, wherein the alkali metal chloride concentration of the alkali metal chloride solution entering e) is in the range of from 100 to 280 g/l and/or the concentration of the sodium hydroxide solution obtained in e) is in the range of from 13 to 33% by weight.

10. The process of claim 9, wherein the alkali metal chloride concentration of the alkali metal chloride solution entering e) is in the range of from 110 to 220 g/l and/or the concentration of the sodium hydroxide solution obtained in e) is in the range of from 20 to 32% by weight.

11. The process of claim 1, wherein an ion exchanger membrane whose water transport per mole of sodium ion is greater than 4 mol of $H_2O$/mol of sodium is used in e).

12. The process of claim 11, wherein the water transport per mole of sodium ion of said exchanger membrane is in the range of from 5.5 to 6.5 mol of $H_2O$/mol of sodium.

13. The process of claim 1, wherein the electrochemical oxidation of e) is operated at a current density of 2 to 6 kA/m$^2$, the area taken as a basis for calculating the current density being the membrane area.

14. The process of claim 1, wherein the electrochemical oxidation of e) is operated at a temperature in the range of from 70 to 100° C.

15. The process of claim 14, wherein the electrochemical oxidation of e) is operated at a temperature in the range of from 80 to 95° C.

16. The process of claim 1, wherein the electrochemical oxidation of e) is operated at an absolute pressure in the range of from 1.0 to 1.4 bar.

17. The process of claim 16, wherein the electrochemical oxidation of e) is operated at an absolute pressure in the range of from 1.1 to 1.3 bar.

18. The process of claim 1, wherein the electrochemical oxidation of e) is operated with a pressure difference between cathode space and anode space in the range of from 20 to 150 mbar.

19. The process of claim 18, wherein the electrochemical oxidation of e) is operated with a pressure difference between cathode space and anode space in the range of from 30 to 100 mbar.

20. The process of claim 1, wherein the electrochemical oxidation of e) is operated with an anode which contains, as a coating, ruthenium oxide and at least one further noble metal compound of the 7th and 8th subgroups and/or of the 4th main group of the Periodic Table of the Elements.

21. The process of claim 1, wherein anodes having a larger surface area than the surface area of the membranes are used in the electrochemical oxidation of e).

22. The process of claim 1, wherein the alkali metal chloride-containing solution of d) is concentrated before e) by means of a membrane process.

23. The process of claim 1, wherein said at least one bisphenol is a dihydroxydiarylalkane of formula (I)

HO—Z—OH          (I)

wherein Z is a divalent organic radical having 6 to 30 carbon atoms which contains one or more aromatic groups.

24. The process of claim 1, wherein said at least one bisphenol is selected from the group consisting of 4,4'-dihydroxybiphenyl; 2,2-bis(4-hydroxyphenyl)-1-phenylpropane; 1,1-bis(4-hydroxyphenyl)phenylethane; 2,2-bis(4-hydroxyphenyl)propane; 2,4-bis(4-hydroxyphenyl)-2-methylbutane; 1,3-bis[2-(4-hydroxyphenyl)-2-propyl]benzene; 2,2-bis (3-methyl-4-hydroxyphenyl)propane; bis(3,5-dimethyl-4-hydroxyphenyl)methane; 2,2-bis(3,5-dimethyl-4-hydroxyphenyl)propane; bis(3,5-dimethyl-4-hydroxyphenyl) sulphone; 2,4-bis(3,5-dimethyl-4-hydroxyphenyl)-2-methylbutane; 1,3-bis [243,5-dimethyl-4-hydroxyphenyl)-2-propyl]benzene; 1,1-bis(4-hydroxyphenyl)cyclohexyne; and 1,1-bis(4-hydroxyphenyl)-3,3,5-trimethylcyclohexane.

25. The process of claim 1, wherein at least a portion of the alkali metal chloride-containing solution is combined with wash water from c) prior to the electrochemical oxidation of e).

26. The process of claim 1, wherein c) comprises:
aa) separating polycarbonate-containing organic phase and aqueous alkali metal chloride-containing reaction wastewater solution;
bb) washing the polycarbonate-containing organic phase obtained in aa) at least once;
wherein at least a part of the wash phase(s) from bb), after separating out catalyst residues and optionally organic solvent residues, is optionally used as a partial replacement of the water for preparing the sodium hydroxide solution of b).

* * * * *